Patented Jan. 26, 1937

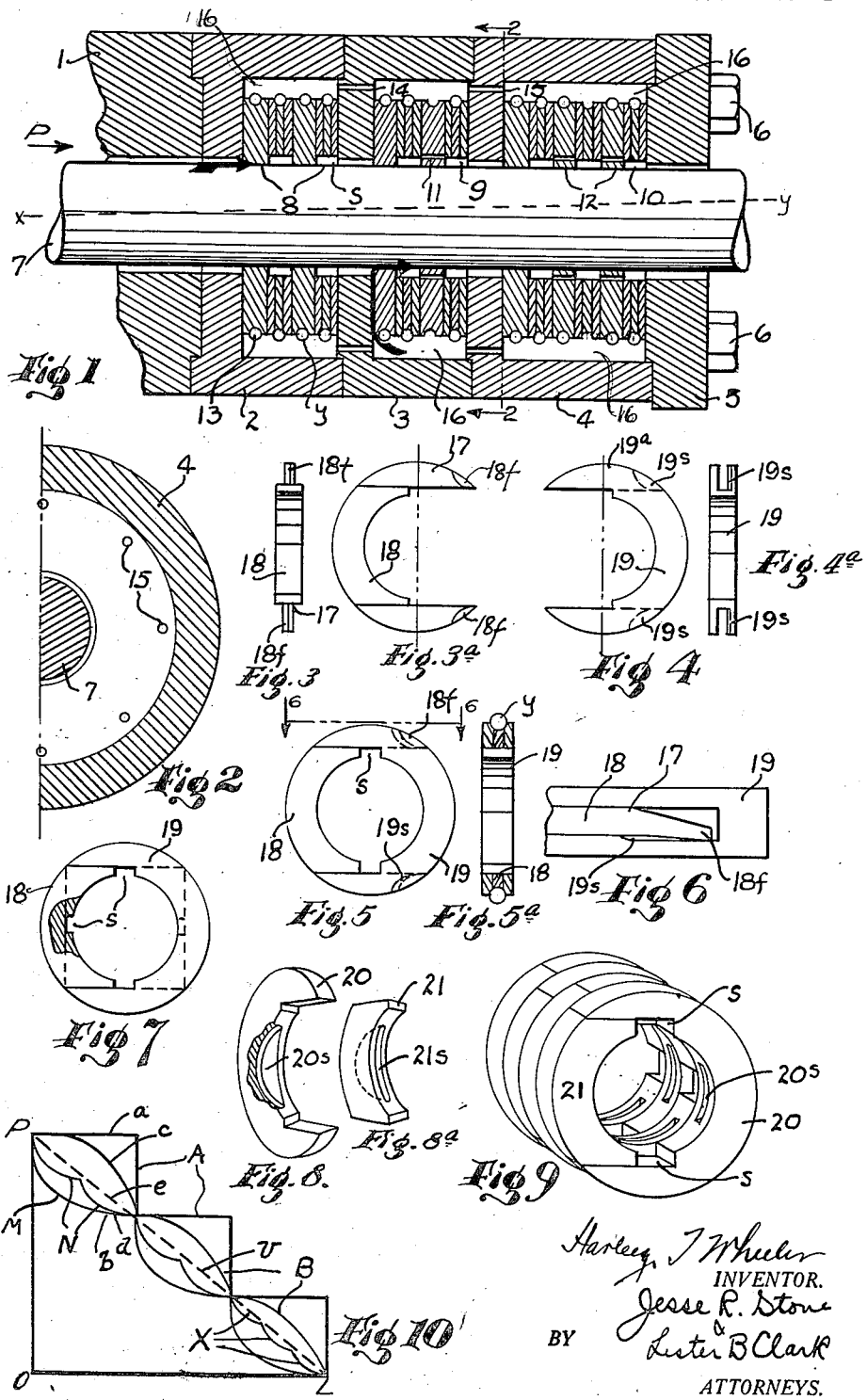

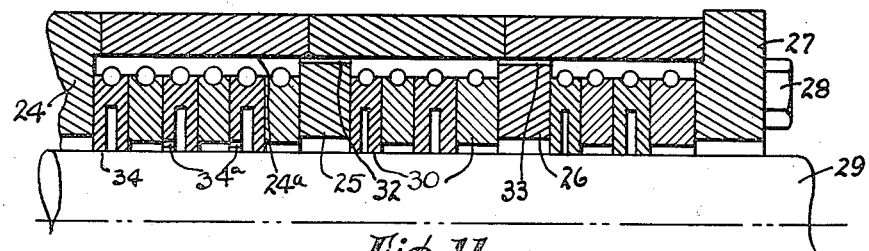
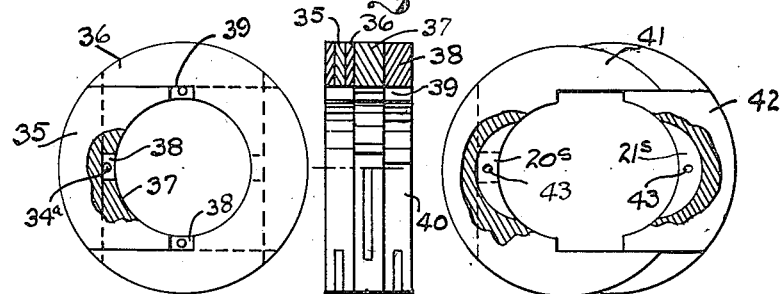
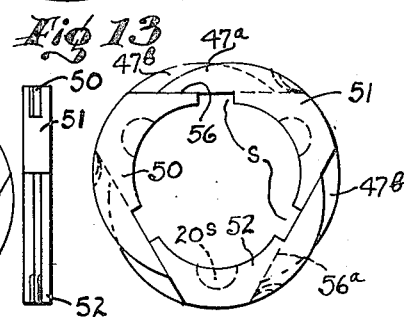
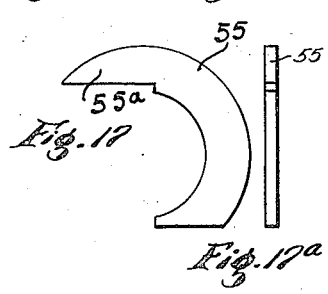
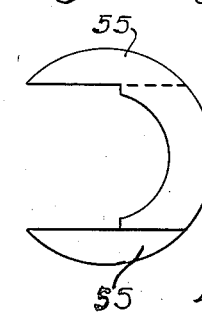
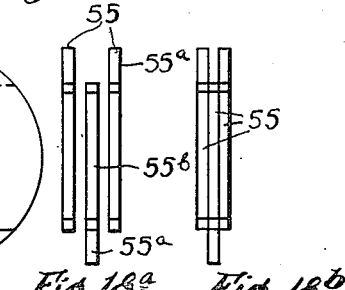

2,068,723

UNITED STATES PATENT OFFICE 2,068,723

METALLIC PACKING FOR VARIABLE PRESSURES

Harley T. Wheeler, Dallas, Tex.

Application June 1, 1933, Serial No. 673,818

16 Claims. (Cl. 286—24)

My invention relates to metallic packing rings for use on rods or for use on pistons and other similar situations.

It is an object of my invention to control the pressure differential which causes the packing to bear against the moving part, particularly under variable pressure and thereby regulating the friction of contact. It is adapted for use particularly where the rod is a reciprocating rod and in which the pressure surges rapidly in alternate directions.

Another object is to provide a packing ring designed to maintain a tight pressure on sliding joints regardless of the degree of angularity of the rod.

Another object is to provide a packing ring made up of interfitting sections adapted to be held in fixed position by a friction lock independently of the usual circumferential spring.

I desire to provide a sectional metallic packing ring which will remain in operating position even where the garter spring may break.

I further provide a packing ring assembly wherein allowance is made for seepage of the pressure fluid longitudinally of the box through restricted orifices, thereby maintaining the pressure drop throughout the length of the box under control during the rise and fall of pressure.

In the drawings herewith Fig. 1 is a central, longitudinal section through a stuffing box constructed in accordance with my invention, the rod being shown broken off.

Fig. 2 is a partial end view in section on the plane 2—2 of Fig. 1.

Fig. 3 shows an end elevation of one portion of my metallic ring.

Fig. 3a shows a side view of the segment disclosed in Fig. 3.

Fig. 4 is a side elevation of the cooperating section of the ring.

Fig. 4a shows an end elevation thereof.

Fig. 5 shows an end view of one of my assembled rings.

Fig. 5a shows a central vertical section thereof.

Fig. 6 is a broken side view looking in the direction of the arrows on Fig. 5, illustrating my friction lock.

Fig. 7 is an end view illustrating the manner of assembling a series of packing rings, a portion of one ring being broken away for illustrative purposes.

Figs. 8 and 8a are perspective views of two sections making up one of my improved rings and illustrating the manner of recessing the inner faces of the rings, the position of Fig. 8a being reversed from its proper position.

Fig. 9 is a perspective view illustrating the assembly of a series of rings such as shown in Fig. 8.

Fig. 10 is a pressure chart indicating the pressure control possible by my invention.

Fig. 11 shows a partial cross-section of a metallic packing assembly showing the manner in which the rings may be assembled with interior spaces formed therein.

Fig. 12 shows an end view illustrating an assembly of rings in which seepage openings have been employed in accordance with Fig. 11.

Fig. 12a is a side view of the Fig. 12 ring partly in section.

Fig. 13 is an end view of a sectional metallic ring partially assembled and illustrating the seepage openings.

Fig. 14 shows an end view and Fig. 14a is a side elevation of a slightly different embodiment of the invention.

Fig. 15 is an end view of an assembled ring and Fig. 15a a side view of the same.

Fig. 16 shows a ring somewhat expanded for purposes of illustration.

Fig. 17 and Fig. 17a show an end and side elevation respectively of a section of a packing ring of universal construction which may be employed in making up complete rings.

Fig. 18 shows an end view and Figs. 18a and 18b show two side elevations illustrating the manner in which similar sections may be assembled to make up a ring.

My packing is particularly adapted for use in stuffing boxes employed in packing off pressures which are variable due to the reciprocation of the rod of a pump plunger and the like.

In Fig. 1 I have shown how the packing may be assembled in a stuffing box placed around the opening in the machine frame 1. I have shown three separate stages of packing indicated at 2, 3, and 4, the remote end of the section 4 being closed by a gland member 5 held in position by cap screws 6 in the usual manner. The rod 7 extending through the assembly has a free clearance through the walls of the stuffing box and it is to be noted that there are partitions setting off three separate chambers in which the packing is to be assembled. I have shown four separate rings in each of the two chambers adjacent the pump, each ring being held in assembled position on the rod by garter springs 13, it being understood that other similar means may be employed in holding the sections of the assembled rings together. The three sets of rings 8, 9, and 10, show a preferred assembly of the rings, although manifestly this assembly may be varied as desired. Section 10 having six rings in the set may manifestly be made with any desired number.

The rings are shown of smaller external diameter than is the interior diameter of the stuffing box thus providing spaces 16 around the outer periphery of the rings and between the same and the interior wall of the chamber in which they are assembled.

Between the adjacent chambers I have shown seepage openings 14 and 15 to relieve sudden pressures upon the packing and allowing the passage of the pressure fluid slowly from one chamber to the adjacent one. I have also shown the manner in which the rings may be recessed adjacent the rod to allow a limited passage of fluid longitudinally of the box. This will be noted at 11 and 12.

My metallic packing rings are made up of sections adapted to be interfitted about the rod to make up a complete ring. In Fig. 3 I have shown a ring section 18 which is semi-circular between its ends and has at each end thereof a tongue 17 of reduced thickness extending forwardly from the central section 18.

In Figs. 4 and 4a is illustrated a similar section adapted to interfit with the section shown in Fig. 3. This section has an intermediate portion 19 of the full thickness of the ring and its ends 19a are slotted as at 19s to receive the tongue portion 17 of the adjacent section. My improved ring distinguishes from prior rings of this general character by having a tongue which fits within a slot in the meeting section so as to form a tight joint about the rod. To hold these two sections of the ring together after they have been inter-fitted, I provide on the section 18 a tongue 18f which is bent laterally from the plane of the tongue 17. This is illustrated more particularly in Fig. 6, and it will be noted that the section 19 is recessed slightly on the slotted portion at 19s to provide for engagement therein of the tongue 18f.

It is to be understood that when the two sections are inter-fitted, the end 18f is deflected slightly as it is forced into the slot of the adjacent section, but when the two parts are completely inter-fitted the tongue end 18f will engage frictionally in the recess 19s and resist a tendency of the parts to become disengaged. When these inter-fit a garter spring Y may be employed to hold the sections in engagement, if desired. This is illustrated in Figs. 1 and 5.

When the rings thus formed are fitted together there are opposite notches or recesses s which form a space or void through which pressure fluid has a limited passage. When the sets of rings are assembled, however, I contemplate staggering or off-setting these notches on adjacent rings.

In Fig. 7 I have shown them off-set 90° this arrangement being optional. By so doing, the passage of the pressure fluid longitudinally of the assembly is restricted.

In Figs. 8 and 8a I have shown how the ring may be made up of two sections of uniform width adapted to be interfitted to entirely enclose the rod. Each of these sections 20 and 21 is recessed on its interior arcuate surface as shown at 20s and 21s.

Thus, when the section of Fig. 8a is reversed in position and fitted into the open side of the section 20 to enclose the rod there will be intermediate recesses on each side of the ring into which pressure fluid may accumulate. When these kinds of rings are employed I contemplate assembling them as shown in Fig. 9 with the gaps S off-set from each other on adjacent rings and with the recesses 20s also off-set from each other on adjacent rings. It will be noted particularly from Fig. 9 that gaps S form recesses or chambers longitudinally of the assembled set of rings into which the pressure fluid may accumulate.

Referring to Fig. 10, the ordinates of which are in pressure, the abscissas in length of the contact, the series of abruptly dropping pressure lines, A represents the usual condition obtaining. The sloping curves B are made possible by use of the orifices 11, 12, 14, and 15, and more nearly approach the dotted line U, the ideal uniform drop which it is possible to attain, but not practical with commercial construction.

Returning now to Fig. 1, the line $xy$ at an angle with the rod centerline represents what is termed "angularity of the rod" and occurs due to vibration, misalignment, wear of the supporting member, and the like. When this happens the metallic ring segments depending on tightness for their perpendicular relation to the moving surface, will open on their sliding joints. Since all metallic ring segments up to this time have either plane faced tangential sliding or stepped joints which may be moved relatively to each other by angular movements, I have originated the tongue and slotted assembly which prevents the beforementioned movements during angularity.

As has been stated a pair of metallic packing rings in contact with a metal or hard rod will resist a certain amount of pressure at the joint on the moving surface. A rise of pressure will blow the lubricant off at points shown by the heavy arrows of Fig. 1, resulting in a sudden rush of the pressure fluid along the moving surface and into the adjoining compartment voids. This action is shown by the representative curves M of Fig. 10.

By arranging a series of contact surfaces alternated with spaces between the rings, the sudden pressure drop is minimized by the intervening spaces, resulting in a more gradual drop, such as is shown by the curves N or X. A greater number of such alterations results in a more uniform drop of pressure, approaching the line U. It may now be noted that the less pressure difference there is between the voids or spaces S and points on the movable surface, the less thrust there will be of the rings against that surface, hence the less the friction of contact. My arrangement of a series of rings having joints which exclude the pressure in the voids, yet which permit a gradual reduction of pressure along the moving surface, cause less difference of pressure than any design yet known.

To further illustrate the control of pressure the thickness and construction of the packing rings may be noted. In Fig. 11 is shown a slightly different assembly of rings. The stuffing box is shown as being assembled about the rod opening in the engine frame 24, the sections 24a, 25, and 26 are held in position on the frame by the gland 27 and the cap screws 28. The rod 29 is adapted to reciprocate through this stuffing box as in the previous embodiment. The sets of packing are arranged approximately as in the previous construction, except that the first set in the section 24a is slightly longer than the two outer sections and includes a set of six rings.

The compartments are connected by orifices 32 and 33, allowing seepage of the pressure fluid from one chamber to the adjacent. The rings in this construction may be made up similar to those shown in Figs. 8 and 9 and are assembled as there illustrated.

In this assembly the rings in the section 24a are of like thickness. In the section 25 the sections are of two different thicknesses and in the section 26 the rings increase in thickness gradually away from the source of pressure. Thus, in addition to the use of joint spaces and pressure spaces, I vary the thickness of the rings to regulate the pressure drop by means of the degree of "wire drawing" across varying widths of contact. To further regulate the control of pressure across the rings, attention is called to Fig. 12 in which seepage openings 34a are formed in one ring adjacent to the spaces or recesses 38 in the adjacent ring, thereby allowing a restricted flow of pressure fluid longitudinally of the stuffing box. The section 36 on each ring receives the section 35 which interfits therewith so as to form a notch 38 in opposite sides of the rings and in the adjacent set an opening 34a in the ring is adapted to register with the notch 38 in the first ring.

In Fig. 13 the section 41 interfits with the smaller section 42 and each of the sections is formed with a recess 20s and 21s as in the Fig. 8 embodiment. In one wall of each of the recesses is formed an opening 43 so that the pressure fluid may find restricted entrance thereto as into a pocket, thus restricting the flow, but allowing the formation of a liquid film along the shaft.

The rings may be joined together to make up packing rings with two or more segments, and such construction of segments is illustrated in Figs. 14 to 18, inclusive. In Fig. 14 the ring is made up of two identical sections, 47 and 48. Section 47 has a body portion with one end 47a slotted and the opposite end 47b formed with a tongue to interfit with the slotted end 47a of the adjacent section 48. These rings are also formed with friction means 49 by which the sections are held temporarily in assembled position. In Fig. 15 the ring is made up of three interfitting sections and each of the three sections is similar in construction to each of the other sections. Each section 50, 51, and 52 has a tongue at one end and a slotted arm at the other. I have also shown in this ring a recess 20s on each of said sections.

In Fig. 16 I have illustrated how this ring is arranged to hold together and expand uniformly. Each section moves to expand or to contract uniformly and the recesses S remain uniformly, each of the same width as the others. Thus when section 51 is moved outwardly to the Fig. 16 position, the slotted arms 47a lie against the shoulder 56 on the section 50 and the tongue 47b at the other end bears against shoulder 56a. The result is that the sections do not separate easily and that the movement of one causes a similar movement of the other sections.

In Fig. 17 I have shown how a complete ring may be made up, a part of which I have indicated at 55. This section is formed on the arc of a circle through the larger part of its length, and has one end extended as shown at 55a, so as to inter-fit with an adjacent section. This section as shown in the drawings is comparatively thin and must be interfitted with a plurality of other sections to make up a complete ring which must be in thickness three times the thickness of the section 55.

In Figs. 18 to 18b, for example, the part 55 has been shown as assembled with two adjacent sections and in doing so the two outer sections have the tongue portion 55a spaced opposite each other and the intermediate portion 55b has the arm 55a extended in the opposite direction. When thus assembled they make up one-half of the assembled ring as will be understood from this drawing. It is thus obvious that the packing ring which I have disclosed may be made up in different ways, and that the structure of the ring may be varied in various ways without departing from the invention.

In the use of my invention it is to be understood with reference to Fig. 1, that the pressure fluid is presented against the packing in alternating surges which may be at very closely spaced intervals. The pressure fluid may leak along the shaft or around the rings into the outer chamber 16 and from one chamber to the other through the seepage openings 14 and 15. Thus, although a limited amount of pressure fluid may pass through the seepage openings provided, the restricted size of the orifices may prevent the escape through the length of the stuffing box in the short period between surges.

By providing spaces between adjacent rings into which the pressure fluid may be received I provide for a film of liquid along the shaft which preserves a seal during the operation of the pump. I thus prevent the accumulation of the pressure against each individual ring which would tend to flow past the rings and between the same and the rod and remove the lubricating film adjacent the shaft and thus cause the packing to heat up and deteriorate.

What I claim is:

1. A metallic packing ring including two segments adapted to interfit, each segment including a central body portion, one segment having a forwardly extending tongue at each end and the other segment having a slotted arm at each end to receive said tongue, and a curved end on each tongue adapted to frictionally engage in a recess in each of said slotted arms and resist disengagement of said segments.

2. A packing ring assembly for stuffing boxes comprising a plurality of cylindrical boxes adapted to fit about a rod and abutting together end to end, and a plurality of metallic packing rings in each box, said rings being of smaller diameter than the interior of said boxes, there being restricted orifices connecting said boxes to permit seepage between said boxes of pressure fluid.

3. A packing ring assembly for stuffing boxes comprising a plurality of cylindrical boxes adapted to fit about a rod and abutting together end to end, and a plurality of metallic packing rings in each box, said rings being of smaller diameter than the interior of said boxes there being restricted orifices connecting said boxes to permit seepage between said boxes of pressure fluid, and certain of said rings having longitudinal orifices to allow a restricted passage of pressure fluid adjacent said rod.

4. Metallic packing rings adapted to fit within a box about a reciprocating rod, said rings made up of a plurality of interfitting segments which, when assembled, contact with said rod except for gaps left at spaced points between adjacent segments of each ring, certain of said rings having longitudinal openings adapted to register with said gaps in adjacent rings and allow a restricted flow of pressure fluid longitudinally of said box.

5. Metallic packing members for use under alternating pressures including segmental rings having restricted orifices longitudinally thereof to permit seepage of pressure fluid in both directions, there being inner recesses in said rings cooperating with adjacent rings to form closed spaces in which pressure fluid may be received.

6. A cylindrical metallic packing ring including a plurality of arcuate sections formed on the arc of a circle, each section having a tongue at one end, and a slot on the other end of said section to receive the tongue on the adjacent section, said tongue, when in either extended or closed position within the slot of said adjacent section, bearing against the bottom of said slot as well as against the side walls thereof, so as to tend to hold said sections together, but allowing uniform movement of all said sections simultaneously.

7. A cylindrical metallic packing ring including a plurality of arcuate sections formed on the arc of a circle, each section having a tongue at one end, shoulders at each side of said tongue, and a slot on the other end of said section to receive the tongue on the adjacent section, said tongue when said sections are in either extended or contracted position within the slot of said adjacent section, bearing against the bottom of said slot, and the slotted end bearing against said shoulders, so as to tend to hold said sections together, and preventing radial contraction except by sliding of said tongues on said shoulders but allowing uniform movement of all said sections simultaneously.

8. A metallic packing ring for rods, said ring having outer and inner cylindrical surfaces and including two segments adapted to interfit and to engage about said rod in a plane radial to the axis thereof, each segment including a central body portion, one segment having a forwardly extending tongue at each end, the inner edges of said tongues being parallel and the other segment having a slotted arm at each end to receive said tongue, the said inner edges of said tongues engaging the opposite sides and against the bottom of said slotted portions of said arms when said segments are assembled, and friction means on said tongues to hold said segments in assembled position with said tongues projecting into said slotted arms.

9. A metallic packing ring for rods, said ring being made up of a plurality of segmental interfitting sections making a complete circle and flattened in a plane radial to said rod, each section having a tongue and slot connection with adjacent sections and friction means associated with each of said tongues to resist separation of the assembled ring including an offset notch in each groove and a resilient end on said tongue engaging therein.

10. A plurality of contacting metallic rod-packing rings each made up of a plurality of interfitting segments lying radial to said rod, one of said sections having an opening longitudinally thereof adjacent said rod to allow seepage of fluid pressure therethrough.

11. A metallic packing ring for rods, said ring being made up of a plurality of segmental interfitting sections making a complete circle and flattened in a plane radial to said rod, each section having a tongue and slot connection with adjacent sections, the tongue on one section having continuous contact with the sides and bottom of the slot in which it fits on an adjacent section at all times when the sections are assembled.

12. A metallic rod packing ring made up of a plurality of interfitting segments, each segment having a slot with plane parallel sides and a bottom formed on a chord of the ring, a tongue on the opposite end of each segment fitting slidably against the sides and bottom of the groove in an adjacent segment, said tongues by bearing against the bottoms of said grooves tending to cause simultaneous movement of all said segments together when said ring is expanded or contracted.

13. A metallic packing ring including a plurality of segments, and means on one of said segments resiliently engaging a shoulder on an adjacent one of said segments to yieldably resist undue separation of said segments.

14. A stuffing box having a plurality of separate chambers therein, and an axial opening for a rod, partitions separating said chambers, sectional metallic packing rings to pack about said rod, and constricted orifices through said partitions outside said rings to allow slow passage in alternate directions therethrough of pressure fluid.

15. A stuffing box divided by transverse partitions into a plurality of separate chambers and having an axial opening for a rod, a constricted orifice outside said rings through one of said partitions, sectional metallic packing rings in each of said chambers about said rod, said rings being of smaller external diameter than the internal diameter of said box, means to resist separation of the segments of said ring, at least one of said rings in each chamber having a longitudinal orifice adjacent said rod for passage of pressure slowly therethrough in both directions.

16. A stuffing box, transverse partitions therein dividing said box into separate chambers and having an axial opening for a rod, sectional metallic packing rings in said chambers about said rod, said rings being of smaller external diameter than the internal diameter of said box, at least one of said rings in one of said chambers having a longitudinal orifice adjacent said rod connected with openings through adjacent rings for passage of pressure slowly through said orifice.

HARLEY T. WHEELER.